July 23, 1940.　　　R. E. RISSER, JR　　　2,208,950
METER
Original Filed July 16, 1937　　3 Sheets-Sheet 1

Inventor
Ross Eugene Risser Jr.
By Lyon & Lyon
Attorneys

July 23, 1940.   R. E. RISSER, JR   2,208,950
METER
Original Filed July 16, 1937   3 Sheets-Sheet 2
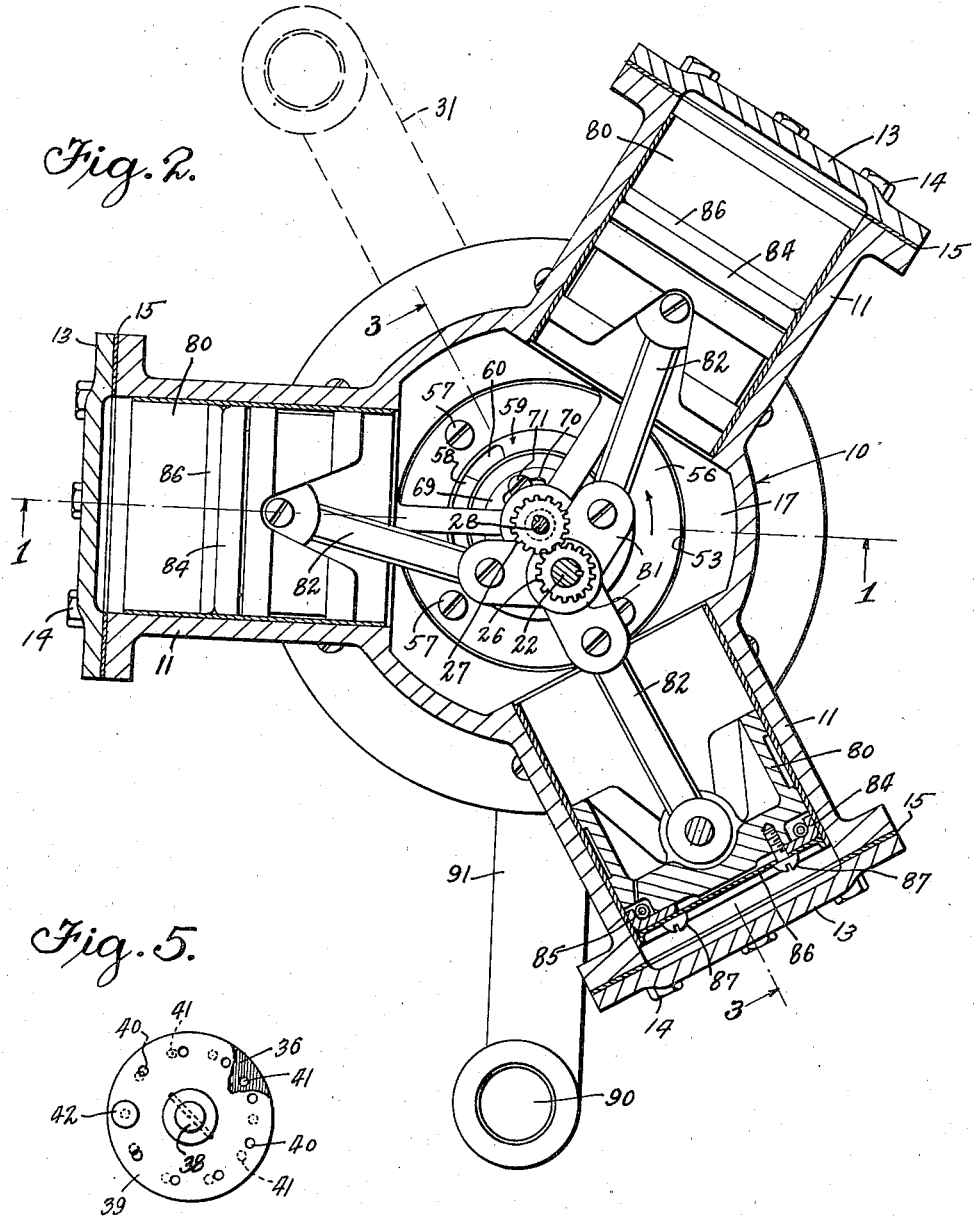
Inventor
Ross Eugene Risser Jr.
By Lyon & Lyon
Attorneys July 23, 1940.   R. E. RISSER, JR   2,208,950
METER
Original Filed July 16, 1937   3 Sheets-Sheet 3

Inventor
Ross Eugene Risser Jr.
By Lyon & Lyon
Attorneys

Patented July 23, 1940

2,208,950

UNITED STATES PATENT OFFICE 2,208,950

METER

Ross Eugene Risser, Jr., Bonham, Tex.

Application July 16, 1937, Serial No. 153,956
Renewed January 4, 1940

3 Claims. (Cl. 74—600)

This invention relates to improvements in a meter of the positive displacement type such as adapted for use in dispensing apparatus for accurate measurement of a volume of liquid delivered as required, and for other uses where the volume of liquid flow through a pipe under pressure, is to be determined with precision.

One object of the invention is to provide a liquid measuring appliance operated by pressure of the liquid flowing therethrough, so constituted that operation of the appliance and the flow of liquid therethrough by which it is actuated, are uniformly concurrent throughout the cycles of operation, irrespective of variations in the operating speed or in the pressure of the fluid.

Another object is to so construct and arrange the various parts of the apparatus as to occasion but negligible wear and frictional resistance that ordinarily occurs because of corrosion thereof, and intermittent or hard usage.

A further object is to provide means conveniently accessible for adjustably increasing or decreasing the stroke of the plungers to thereby regulate or vary the displacement of liquid as it passes through the meter.

A further object is to provide a crankshaft having means whereby the throw of the shaft may be readily adjusted and locked in adjusted position.

A further object is to provide each of the pistons of the meter with a cup leather, which may be readily removed from the piston by removing the cylinder head.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit and scope of the invention as the same is set forth in the appended claims.

In the drawings:

Fig. 2 illustrates a sectional view taken substantially in the plane of line 2—2 of Fig. 1.

Fig. 5 illustrates a fragmental sectional view taken substantially in the plane of line 5—5 of Fig. 1.

Figure 1:
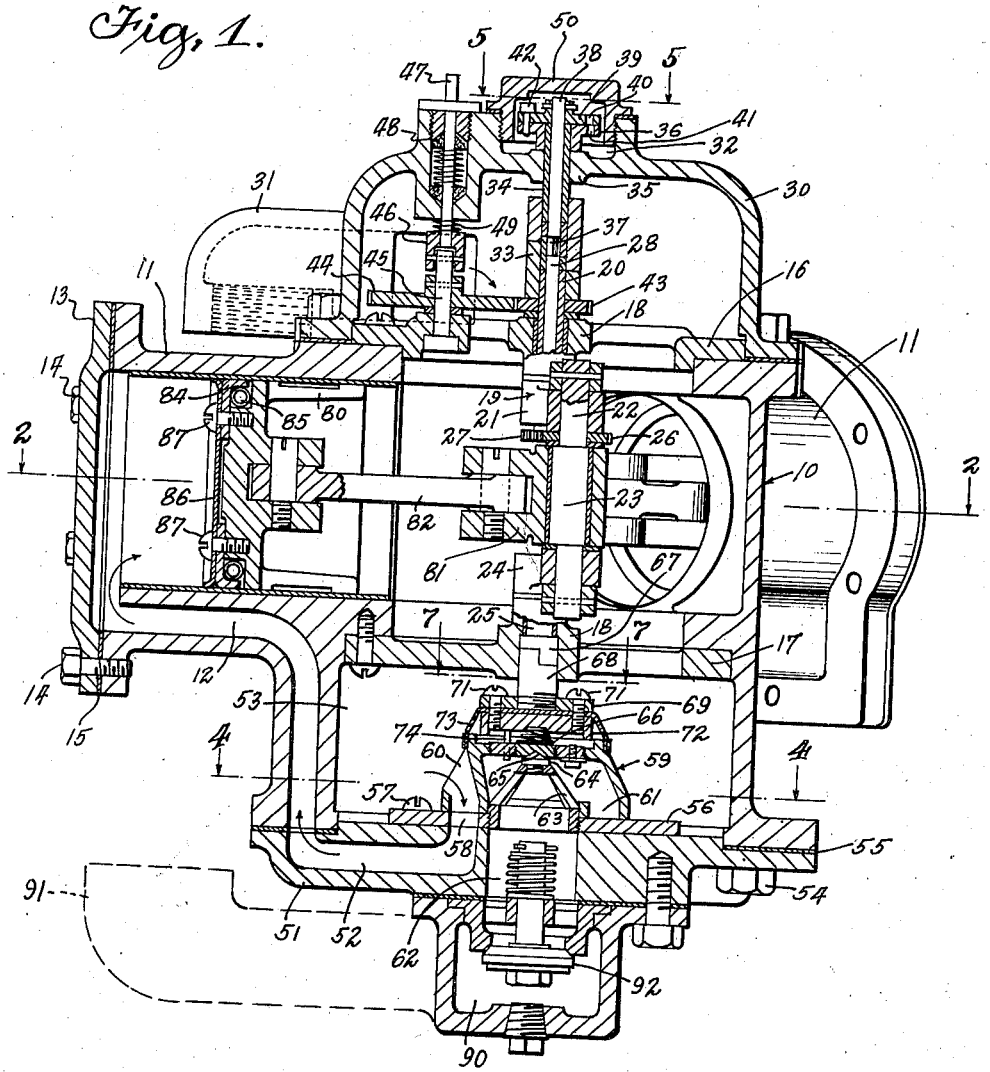
Fig. 1 illustrates a cross-sectional view taken substantially in the plane of line 1—1 of Fig. 2.
Figure 7:
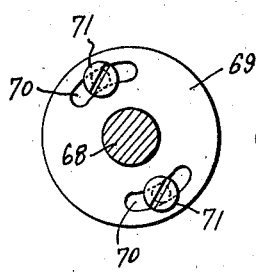
Fig. 7 illustrates a coupling device between the crankshaft and a valve.

In the preferred embodiment of the invention, the meter includes a crank case 10 having three equally spaced and radially related cylinders 11. It will be understood, however, that if preferred, a greater number of cylinders may be provided. The crank case is provided with a port or passageway 12 leading to each of the cylinder bores. Each cylinder is provided with a suitable cylinder head 13 mounted thereon as by suitable screw means 14, and if preferred, a gasket 15 may be positioned between the cylinder and the cylinder head 13. The crank case is provided with bearing flanges 16 and 17 passing through the crank case at opposite sides thereof in any preferred manner. Each of the bearing flanges includes a crankshaft bearing 18, and these flanges are provided with openings so that the fluid under treatment may pass through the crank case. Journalled in the bearings 18 is a crankshaft 19, which is of a particular construction to provide an adjustable throw for regulating the quantity of fluid passed through the meter for each revolution of the shaft. The crankshaft includes a main shaft portion 20 carrying at its inner end a crank arm 21. A crank pin 22 is journaled in the outer end of the crank arm 21 and is provided with an eccentric bearing surface 23. In the form of crankshaft bearing shown, it is preferable to provide a crank arm 24 spaced from the crank arm 21 in the free end of which the opposite end of the crank pin 22 may likewise be journalled. The crank arm 24 is mounted upon a short shaft 25 supported in bearing 18 of the lower bearing flange 17. It will be understood that the shafts 20 and 25 are in axial alignment. In order to control the position of the eccentric bearing surface 23 of the crank pin 22, a gear 26 is fastened to the crank pin 22 adjacent the inner side of the crank arm 21, and a corresponding meshing gear 27 is carried upon the end of an adjusting shaft 28, which extends through the main shaft 20. By this arrangement it will be readily appreciated that an angular rotation of the adjusting shaft 28 with relation to the main shaft 20 will, through the gears 27 and 26, rotate the crank pin 22 thereby adjusting the eccentric bearing surface 23 to increase or decrease the effective throw of the crankshaft. Means are provided for adjusting the throw of the crankshaft through the adjusting shaft 28, and for locking the adjusting shaft to the main shaft 20 when the adjustment has been reached. This means will be described later. As may be observed in Fig. 1, an inlet cover 30 is securely fastened upon the upper surface of the crank case by screw means not shown. The cover is provided with a liquid inlet passage 31 through which the liquid entering the meter passes. Excepting for the inlet passage 31, the cover 30 completely seals the upper portion of the crank case. The cover is provided with a pocket 32 in which the adjusting and locking means for the crankshaft is mounted. As will be observed in Fig. 1, the crankshaft 20 is provided with a universal coupling 33 of the step type, whereby the coupling can be connected in one only angular relation to the shaft. The coupling carries a tubular shaft 34 which extends through a bearing 35 formed in the cover 30 between the pocket 32 and the inside cavity of the cover. The tubular shaft 34 carries at its end a locking disc 36 (Figs. 1 and 5). Referring again to Fig. 1, it will be observed that the adjusting rod 28 is provided with a universal joint 37 of the same type as the universal joint 33 for the main shaft, but is of smaller size and is mounted within the main universal joint 33. The small universal joint 37 connects the adjusting shaft 28 to a disc shaft 38, which shaft carries at its upper end a locking disc 39. Referring to Fig. 5, the locking discs 36 and 39 are each provided with a series of concentrically arranged locking holes 40 and 41. In this figure it will be noted that there are nine equally spaced locking holes provided in the disc 39, while in the locking disc 36 there are ten equally spaced locking holes. Due to this spacing of the locking holes a very fine and accurate setting of the adjusting means for thereby determining the throw of the crankshaft, is obtained. The two discs may be locked together by placing a locking pin 42 (Figs. 1 and 5) through the holes 40 and 41, which are in axial alignment for the particular adjustment of the crankshaft. As will be appreciated, this mechanism provides a simple positive accurate means for adjusting the throw of the crankshaft, which cannot be easily damaged during the adjustment of the crankshaft throw.

To transmit the motion of the crankshaft to a suitable recording mechanism (not shown) the main shaft 20 is provided with a driving gear 43 arranged to drive gear 44 carried by the short shaft 45 journalled to the bearing flange 16 and having its axis parallel to the axis of the crankshaft. The upper end of this short shaft is provided with a universal joint 46 by means of which the meter or register driving shaft 47 is detachably connected. The meter shaft 47 is journalled in and extends through the cover 30, which is provided with a suitable form of stuffing-box 48 for sealing the passage of the shaft through the cover against leakage. A spring means 49 may be provided around shaft 47 between the adjacent portion of the cover, and the upper end of the universal 46, to resiliently urge the upper portion of the universal joint into driving relation with its corresponding portion carried by the short shaft 45. It will be understood that a register or meter of suitable form may be connected to and driven from the end of the shaft 47 which projects through the casing 30.

The universal joints 33, 37 and 46 are provided so that the cover 30 may be readily removed to inspect or clean the interior of the meter without the necessity of disassembling the crankshaft and connected parts from the crank case. In the meter shown, it is only necessary to disconnect the supply pipe to the portion 31 of the cover, and remove the cover screws and thereafter lift the cover clear of the crank case; and due to the particular form of universal joints 33 and 37 when the cover is reassembled upon the crank case, the shaft 20 and adjusting shaft 28 will be connected to their related parts 34 and 38 in the same adjusted relation as when the cover was removed. The pocket 32 is provided with a cover 50 to prevent leakage of fluid from the meter.

Figure 4:
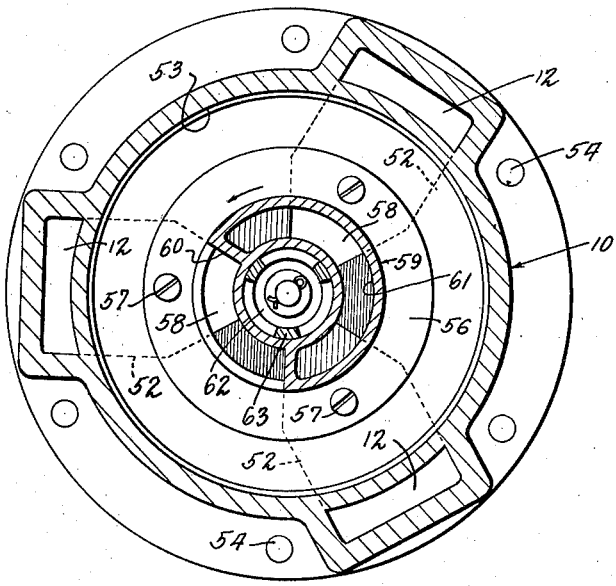
Fig. 4 illustrates a sectional view taken substantially in the plane of line 4—4 of Fig. 1.

Detachably mounted upon the lower end of the crank case is the valve flange 51 having a separate port 52 communicating with each of the cylinder ports 12 (Fig. 1) and forms with the crank case an enclosed valve cavity 53. The valve flange 51 is mounted upon the crank case by screw means 54 and is sealed to the crank case by a suitable gasket 55. A valve plate 56 is mounted upon the flange 51 by screws 57, and is provided with valve ports 58 which register with ports 52 of the flange. The three ports 58 which extend through the valve plate 56, are concentrically arranged (Figs. 1 and 4) to be opened and closed in timed relation with the operation of the meter by a rotating valve 59 flexibly and adjustably connected to the lower end of the crankshaft. The valve 59 includes an inlet port 60 and a discharge port 61 which, during the rotation of the valve progressively open and close the valve ports 58 in timed relation with the operation of the meter, and thereby alternately connect each cylinder with the pressure fluid contained within the crank case with the discharge passage 62 formed concentrically through the valve plate 56 and valve flange 51 (Fig. 1). In order to concentrically maintain the valve 59 with relation to the ports formed through the valve plate, this plate is provided with a centering member 63 having diagonally arranged upwardly extending arms meeting at a common center to support a valve centering cone 64. The valve in turn is provided with a conical depression 65 cooperating with the centering cone 64 to maintain the valve central. This centering feature also assists in supporting a portion of the unbalanced load of the valve. As will be observed in Fig. 1, the portion of the valve which carries the conical depression 65, is made adjustable with relation to the main valve body, whereby the valve may be arranged to seat in fluid-tight relation with the valve plate 56, and yet to bear upon the centering cone 64. The cone 64 and portion 65 may be made of steel and hardened to resist wear. Spring means 66 is provided between the valve and the adjacent end of the crank shaft to yieldingly maintain these parts in operative relation.

It is preferable to provide an adjustable coupling between the crankshaft and valve 59. Connected to the portion 25 of the main crankshaft by means of a universal 67, is the short valve driving shaft 68 carrying at its lower end a flange 69. The flange 69 has a plurality of concentric slots 70 through which extend the screws 71 for clamping the driving disc 72 to the flange 69 (Fig. 1). It is preferable to clamp between the flange and driving discs a flexible sealing diaphragm 73 having its outer periphery suitably connected to the upper portion of the valve 59. Projecting downwardly from the driving discs 72 is a driving pin 74 which extends into the upper surface of the valve and transmits the driving force from the crankshaft to the valve. By means of the slots 70 and screws 71, the valve may be timed or adjusted to open and close the valve ports in timed relation to the operation of the meter.

Slidably mounted in each of the cylinder bores is a piston 80, which is connected to the master bearing 81 journalled upon the eccentric bearing surface 23 of the crankshaft by means of a common form of connecting rod 82. The master bearing 81 is freely journalled upon the eccentric portion of the crankshaft and to which each of the connecting rods is pivotally connected. This is rendered possible due to the pressure of the inflowing liquid acting upon the inner surfaces of the pistons, tending to force them outwardly, thereby maintaining the connecting rods and master bearing in proper operative relation. The rear end of each of the pistons is provided with a cup leather 84 having a coil spring 85 acting to maintain the flange portion and cup leather in sealing relation to the cylinder wall. A suitable plate 86 and screws 87 are provided for clamping the cup leather to the rear surface of the piston. This structure includes one of the important features of this invention in that it permits a ready removal of a worn cup leather and a replacement of a new one in place thereof. This operation requires only the removing of the cylinder head, and secondly, the removal of plate 61 and screws 87, whereupon the worn cup leather may be removed and a new one mounted upon the piston. To make this change it is not necessary to disturb any of the other operating features or elements of the machine.

In the operation of the machine the fluid to be metered is supplied to the device under substantially 20 lb. pressure, and acts to drive the meter in the manner of an engine. During the instroke of each piston, the pressure fluid flows into the cylinder in back of the piston, which is permitted by means of valve 59, and during the return stroke of each piston the valve will have turned to connect the port of the discharging piston with the discharge passage 62 which, in turn connects with the main discharge passage 90 formed in the outlet elbow or casing 91.

Figure 3:
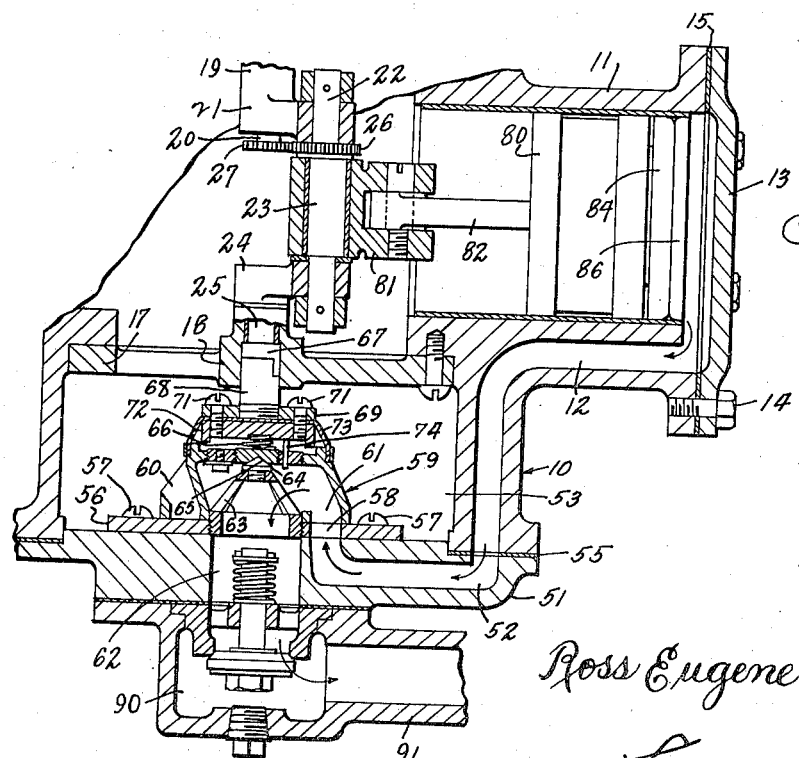
Fig. 3 illustrates a fragmental sectional view taken substantially in the plane of line 3—3 of Fig. 2.

In some installations, it is preferable to provide a check valve in the discharge passage. As illustrated in Figs. 1 and 3, the check valve is indicated at 92 and is of more or less standard construction. The meter of this invention includes several inherent features such as the communication of the ports 12 with the lower portion of the cylinder bores, whereby grit or other deleterious matter will drain and discharge from the cylinders. Also, due to the whirling action given to the fluid passing through the crank case, grit or other foreign matter will be thrown outwardly away from the valve 59, thereby saving the valve from undue wear. Also, by means of the adjustable crankshaft, the meter may be accurately adjusted to meter through a predetermined flow of fluid, and when worn, this adjustment may be changed to compensate for the wear which has taken place.

Figure 6:
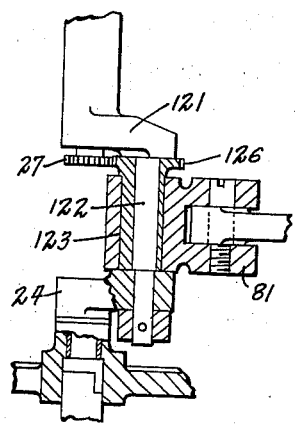
Fig. 6 illustrates a modified form of crankshaft.

In Fig. 6 there is illustrated a somewhat modified form of adjustable crankshaft, which includes forming the crank pin 122 integral with the crank arm 121, and journally mounting the eccentric bearing surface 123 upon the crank pin and connecting the adjusting gear 126 directly to the eccentric bearing surface 123. In all other respects the crankshaft may be identical to that shown in the other figures of the drawings.

No claim is made herein to the connecting rod arrangement as the same forms the subject matter of my divisional application, Serial 271,215, filed May 1, 1939.

Having fully described the invention, it is to be understood that it is not to be limited to the details herein set forth, but the invention is of the full scope of the appended claims.

I claim:

1. In an adjustable throw crank shaft, a tubular main shaft journaled for rotation, a crank arm carried by one end of said shaft, a crank pin carried by the free end of said crank and having an eccentric bearing surface, an adjusting shaft extending through the bore of said main shaft, gear means interconnecting said adjusting shaft and eccentric surface, a locking disc carried by the main shaft having a predetermined number of locking holes, a second locking disc carried by said adjusting shaft in locking relation to said main shaft locking disc and having a predetermined number of locking holes, and means for locking the two discs together by means of said disc holes.

2. In an adjustable throw crank shaft, a tubular main shaft journaled for rotation, a crank arm carried by one end of said shaft, a crank pin carried by the free end of said crank arm, an eccentric bearing journaled upon said pin, an adjusting shaft extending through the main shaft, gear means interconnecting said adjusting shaft and said eccentric bearing, a locking disc carried by said tubular shaft, a cooperating locking disc carried by said adjusting shaft and means for locking said discs together.

3. In an adjustable throw crank shaft, a main shaft journaled for rotation having an offset crank pin, an eccentric bearing journaled upon said pin, an adjusting shaft carried by said main shaft, gear means interconnecting said eccentric bushing and said adjusting shaft, a locking disc carried on the outboard end of said crank shaft having a series of equally spaced adjusting holes, a cooperating locking disc carried on the outboard end of said adjusting shaft having a series of equally spaced adjusting holes of a different spacing from the holes in said crankshaft locking disc and a locking pin extending through a selected hole in each of said locking discs for adjusting the effective throw of said crank shaft.

ROSS EUGENE RISSER, Jr.